US010127045B2

(12) United States Patent
Endou

(10) Patent No.: US 10,127,045 B2
(45) Date of Patent: Nov. 13, 2018

(54) MACHINE TOOL CONTROLLER INCLUDING A MULTI-CORE PROCESSOR FOR DIVIDING A LARGE-SIZED PROGRAM INTO PORTIONS STORED IN DIFFERENT LOCKABLE INSTRUCTION CACHES

(71) Applicant: FANUC Corporation, Minamitsuru-gun, Yamanashi (JP)

(72) Inventor: Katsuhiro Endou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 336 days.

(21) Appl. No.: 14/669,322

(22) Filed: Mar. 26, 2015

(65) Prior Publication Data
US 2015/0286574 A1 Oct. 8, 2015

(30) Foreign Application Priority Data

Apr. 4, 2014 (JP) .................................. 2014-077800

(51) Int. Cl.
*G06F 9/00* (2006.01)
*G06F 9/38* (2018.01)
(Continued)

(52) U.S. Cl.
CPC .......... *G06F 9/3814* (2013.01); *G06F 9/3802* (2013.01); *G06F 9/5066* (2013.01);
(Continued)

(58) Field of Classification Search
CPC ....... G06F 9/3802; G06F 9/3814; G06F 12/12
See application file for complete search history.

(56) References Cited

U.S. PATENT DOCUMENTS 5,913,224 A * 6/1999 MacDonald .......... G06F 12/126
711/125
6,427,204 B1 * 7/2002 Arimilli ................ G06F 9/3802
711/E12.02
(Continued)

FOREIGN PATENT DOCUMENTS

CN 1758229 A 4/2006
CN 101256515 A 9/2008
(Continued)

OTHER PUBLICATIONS

Decision to Grant a Patent dated Aug. 18, 2015 in Japanese Patent Application No. 2014-077880 (3 pages) with an English Translation (3 pages).
(Continued)

*Primary Examiner* — David J. Huisman
(74) *Attorney, Agent, or Firm* — Drinker Biddle & Reath LLP

(57) ABSTRACT

A sequential program is divided into programs each with a size fitted into a cache memory using program profile information and prepared cache memory information. Program profile information on the sequential program and information on the cache memory are acquired. Based on the acquired information, division addresses at which the sequential program is divided are determined. The IDs of the division programs, assigned core numbers, the start addresses and end addresses of the programs, and cache storage block information are stored in a memory as program execution information.

2 Claims, 14 Drawing Sheets

(51) Int. Cl.
*G06F 12/0875* (2016.01)
*G06F 9/50* (2006.01)
*G06F 12/0811* (2016.01)
*G06F 9/445* (2018.01)

(52) U.S. Cl.
CPC .......... *G06F 12/0875* (2013.01); *G06F 9/445* (2013.01); *G06F 12/0811* (2013.01); *G06F 2209/507* (2013.01); *G06F 2209/5017* (2013.01); *G06F 2212/452* (2013.01)

(56) References Cited

U.S. PATENT DOCUMENTS

| | | | |
|---|---|---|---|
| 8,019,946 B2* | 9/2011 | Aciicmez | G06F 12/126 |
| | | | 711/119 |
| 2007/0094452 A1* | 4/2007 | Fachan | G06F 12/0862 |
| | | | 711/137 |
| 2007/0283101 A1* | 12/2007 | El-Essawy | G06F 12/0862 |
| | | | 711/137 |
| 2008/0109817 A1 | 5/2008 | Nakamura | |
| 2008/0235460 A1* | 9/2008 | Togawa | G06F 8/4442 |
| | | | 711/144 |

| | | | |
|---|---|---|---|
| 2012/0042129 A1 | 2/2012 | Kyo | |
| 2013/0097382 A1 | 4/2013 | Kurihara et al. | |
| 2014/0042950 A1 | 2/2014 | Aoyama et al. | |

FOREIGN PATENT DOCUMENTS

| | | |
|---|---|---|
| CN | 101694640 A | 4/2010 |
| CN | 102073533 A | 5/2011 |
| CN | 102662761 A | 9/2012 |
| CN | 102662865 A | 9/2012 |
| CN | 102750257 A | 10/2012 |
| JP | 2005-266997 A | 9/2005 |
| JP | 2010-21828 A | 9/2010 |
| JP | 2014-035564 A | 2/2014 |
| WO | WO-2007-017932 A1 | 2/2007 |
| WO | WO-2011-155046 A1 | 12/2011 |

OTHER PUBLICATIONS

Notification of First Office Action dated Nov. 8, 2016 in Chinese Patent Application No. 2015101580827 (7 pages) with an English translation (10 pages).

\* cited by examiner

FIG.8

PROGRAM EXECUTION INFORMATION ON DIVISION PROGRAM P1
　　ASSIGNED CORE NUMBER　　　:1
　　PROGRAM START ADDRESS　:p1_start
　　PROGRAM END ADDRESS　:p1_end CACHE STORAGE BLOCK INFORMATION
　　START ADDRESS OF BLOCK 1:p1block1_start
　　SIZE OF BLOCK 1　　　:p1block1_size
　　START ADDRESS OF BLOCK 2:p1block2_start
　　SIZE OF BLOCK 2　　　:p1block2_size PROGRAM EXECUTION INFORMATION ON DIVISION PROGRAM P2
　　ASSIGNED CORE NUMBER　　:2
　　PROGRAM START ADDRESS　:p2_start
　　PROGRAM END ADDRESS　:p2_end CACHE STORAGE BLOCK INFORMATION
　　START ADDRESS OF BLOCK 1:p2block1_start
　　SIZE OF BLOCK 1　:p2block1_size
　　START ADDRESS OF BLOCK 2:p2block2_start
　　SIZE OF BLOCK 2:p2block2_size PROGRAM EXECUTION INFORMATION ON DIVISION PROGRAM P3
　　ASSIGNED CORE NUMBER　　　:1
　　PROGRAM START ADDRESS　:p3_start
　　PROGRAM END ADDRESS　:p3_end

...
　　...

PROGRAM EXECUTION INFORMATION ON DIVISION PROGRAM P4
　　ASSIGNED CORE NUMBER　　　:2
　　PROGRAM START ADDRESS　:p4_start
　　PROGRAM END ADDRESS　:p4_end

...
　　...

PROGRAM EXECUTION INFORMATION ON DIVISION PROGRAM P5
　　ASSIGNED CORE NUMBER　:1
　　PROGRAM START ADDRESS　:p5_start
　　PROGRAM END ADDRESS　:p5_end

PROGRAM EXECUTION INFORMATION ON DIVISION PROGRAM P1
  PROGRAM EXECUTION TIME : p1run_time
  ASSIGNED CORE NUMBER    : 1
  PROGRAM START ADDRESS  : p1_start
  PROGRAM END ADDRESS  : p1_end
  PROGRAM INSTRUCTION CACHE STORAGE BLOCK INFORMATION
  BLOCK STORAGE TIME    : p1save_time
  START ADDRESS OF BLOCK 1 : p1block1_start
  SIZE OF BLOCK 1    : p1block1_size
  START ADDRESS OF BLOCK 2 : p1block2_start
  SIZE OF BLOCK 2    : p1block2_size

---

PROGRAM EXECUTION INFORMATION ON DIVISION PROGRAM P2
  PROGRAM EXECUTION TIME  : p2run_time
  ASSIGNED CORE NUMBER    : 2
  PROGRAM START ADDRESS  : p2_start
  PROGRAM END ADDRESS  : p2_end INSTRUCTION CACHE STORAGE BLOCK INFORMATION
  BLOCK STORAGE TIME    : p2save_time
  START ADDRESS OF BLOCK 1 : p2block1_start
  SIZE OF BLOCK 1    : p2block1_size
  START ADDRESS OF BLOCK 2 : p2block2_start
  SIZE OF BLOCK 2    : p2block2_size

---

PROGRAM EXECUTION INFORMATION ON DIVISION PROGRAM P3
  PROGRAM EXECUTION TIME  : p3run_time
  ASSIGNED CORE NUMBER    : 1
  PROGRAM START ADDRESS  : p3_start
  PROGRAM END ADDRESS  : p3_end

. . .
    . . .

---

PROGRAM EXECUTION INFORMATION ON DIVISION PROGRAM P4
  PROGRAM EXECUTION TIME  : p4run_time
  ASSIGNED CORE NUMBER    : 2
  PROGRAM START ADDRESS  : p4_start
  PROGRAM END ADDRESS  : p4_end

. . .
    . . .

---

PROGRAM EXECUTION INFORMATION ON DIVISION PROGRAM P5
  PROGRAM EXECUTION TIME  : p5run_time
  ASSIGNED CORE NUMBER    : 1
  PROGRAM START ADDRESS  : p5_start
  PROGRAM END ADDRESS  : p5_end

. . .
    . . .

MACHINE TOOL CONTROLLER INCLUDING A MULTI-CORE PROCESSOR FOR DIVIDING A LARGE-SIZED PROGRAM INTO PORTIONS STORED IN DIFFERENT LOCKABLE INSTRUCTION CACHES

RELATED APPLICATION DATA

This application claims priority under 35 U.S.C. § 119 and/or § 365 to Japanese Application No. 2014-077800 filed Apr. 4, 2014, the entire contents is incorporated herein by reference.

BACKGROUND OF THE INVENTION

1. Field of the Invention

The present invention relates to a controller that controls a machine tool, and in particular, to a controller that executes a sequential program using a multi-core processor.

2. Description of the Related Art

FIG. 16 is a diagram depicting a conventional numerical controller that executes a sequential program using a multi-core processor.

The numerical controller 10 includes a numerical control section 11, a PMC section 12, a servo motor control section 13, and an amplifier interface section 14. The numerical control section 11 includes a processor core 20, a first-level cache memory (L1 cache) 21, a second-level cache memory (L2 cache) 22, a DRAM 24, and a peripheral LSI 25. These elements are connected together via a bus 23. The PMC section 12 includes a processor core 30, a first-level cache memory (L1 cache) 31, a second-level cache memory (L2 cache) 32, a DRAM 34, and a peripheral LSI 35. These elements are connected together via a bus 33. A machine side IO unit 16 is connected to the peripheral LSI 35 of the PMC section 12 via a field bus 17.

The servo motor control section 13 includes a servo control section processor 40 and a peripheral control LSI 45. These elements are connected together via a bus 43. The amplifier interface section 14 includes a peripheral control LSI 55. A motor control amplifier 18 is connected to the peripheral control LSI 55 of the amplifier interface section 14 via a serial servo bus 19. The numerical control section 11, the PMC section 12, the servo motor control section 13, and the amplifier interface section 14 are connected together via an internal bus 15.

The processor core 20 of the numerical control section 11, which is a main processor for the numerical controller 10 as a whole, reads calculation results from the PMC section 12 and the servo motor control section 13 via the internal bus 15 at each interruption that occurs at a given period. The processor core 20 executes a calculation based on the calculation results and writes a new calculation result to the PMC section 12 and the servo motor control section 13 also via the internal bus 15.

A controller such as a numerical controller that controls a machine tool needs to process a large-sized sequential program with a high priority at a given period within a predetermined time in order to control the position and speed of a servo motor in real time. The processing time for the sequential program significantly affects the performance of the numerical controller. An increased number of steps in the sequential program resulting from additional functions of the numerical controller tend to also increase the processing time. The extended processing time for the sequential program puts pressure on the processing time for other processes. Furthermore, given that the sequential program fails to complete processing within the predetermined time, the numerical controller does not function properly as a system that controls the machine tool.

The problem with the processing time for the sequential program has been solved exclusively by using techniques for increasing the speed of processors (operating frequency, pipeline, cache memory, branch history, and the like). In particular, an increased operating frequency of processors and an increased capacity of cache memories have made a significant contribution.

However, in recent years, the operating frequency of processors has leveled off due to the problem of an increase in power consumption and in the amount of heat generation. Thus, multi-core processors have prevailed in which a plurality of power-saving cores with a low operating frequency is mounted. Also for numerical controllers, a configuration using multi-core processors has been proposed as disclosed in Japanese Patent Application Laid-Open No. 2014-35564.

The multi-core processor is expected to improve performance by allowing the cores to execute threaded programs in parallel. On the other hand, in executing a sequential program, for which the use of threads is difficult, the multi-core processor poses the problem of increased cache misses as described below.

Many multi-core processors are configured such that the second- and subsequent-level cache memories are shared by the plurality of cores. In a multi-core processor with such a configuration, when, while a first core is executing the sequential program, a second core sharing the cache memories executes another program, the program rewrites the shared cache memories. Thus, compared to a single-core processor with the same capacity of cache memories, the multi-core processor is likely to cause cache misses in executing the sequential program.

If a cache miss occurs, the processor reads data needed to execute processing from a memory in which the sequential program is stored, and stores new data in the cache memories as needed. This needs much processing time compared to a case where the first core can utilize the cache memories.

Moreover, when a large-sized sequential process that exceeds the capacity of a first-level instruction cache memory is executed, the program fails to be entirely stored into the instruction cache memory. Thus, even while the sequential program is in execution, the instruction cache memory is rewritten, and a wait time for memory read extends the processing time for the program.

As a method for reducing the above-described cache misses, a prefetch function for the instruction cache memory is known which allows consecutive memory blocks to be prefetched into the instruction cache memory. Prefetching improves a cache hit rate but has difficulty in eliminating cache misses. For example, dynamic conditional branching may lead to a cache miss resulting from a failure in speculative prefetching. Furthermore, a memory read speed is low compared to the operating frequency of the processor, and thus, prefetching may fail to be performed in time, resulting in memory read wait.

SUMMARY OF THE INVENTION

Thus, an object of the present invention is to provide a controller that executes a sequential program using a multi-core processor without causing a cache miss, in order to solve the above-described conventional problems.

A controller according to the present invention includes a multi-core processor including a plurality of cores with independent instruction cache memories, and execute a sequential program with a size exceeding a capacity of the instruction cache memory.

A first aspect of the controller according to the present invention includes a memory in which the sequential program is stored, a program profile information generating section that analyzes an arrangement of the sequential program on the memory to generate and store program profile information in the memory, a program execution information generating section that, based on the program profile information, divides the sequential program into a plurality of programs each with a size fitted into the instruction cache memory and stores program execution information on the divided programs in the memory, a first rewrite inhibiting section that, in accordance with the program execution information, stores the divided programs in the instruction cache memories of the respective cores and inhibits rewriting of the cache memories with the programs stored therein, a second rewrite inhibiting section that, after execution of the stored program is started, based on the program execution information, stores the divided program to be executed next in the instruction cache memory of another core and inhibits rewriting of the cache memory with the program stored therein, and rewrite inhibition canceling section that, when the program in execution ends, starts executing the program to be executed next and cancels the inhibition of rewriting of the cache memory of the core having executed the program.

A second aspect of the controller according to the present invention is the first aspect additionally including a processing time estimating section that estimates a processing time for each of the divided programs, an instruction cache memory storage time estimating section that estimates a time needed to store each of the divided programs in the instruction cache memory, and a program storage starting section that starts storing the program in the instruction cache memory when a remaining execution time before end of the program in execution becomes equal to a time needed to store the program to be executed next in the instruction cache memory.

The present invention can provide a controller for a machine tool which allows a sequential program with a size exceeding the capacity of the instruction cache memory to be executed at high speed without causing a cache miss.

BRIEF DESCRIPTION OF THE DRAWINGS

The above-described and other objects and features of the present invention will be apparent from the following description of embodiments with reference to attached drawings, in which:

FIG. 8 is a diagram depicting an example of program execution information;

FIG. 13 is a diagram depicting an example of program execution information;

DETAILED DESCRIPTION OF THE PREFERRED EMBODIMENTS

Figure 1:
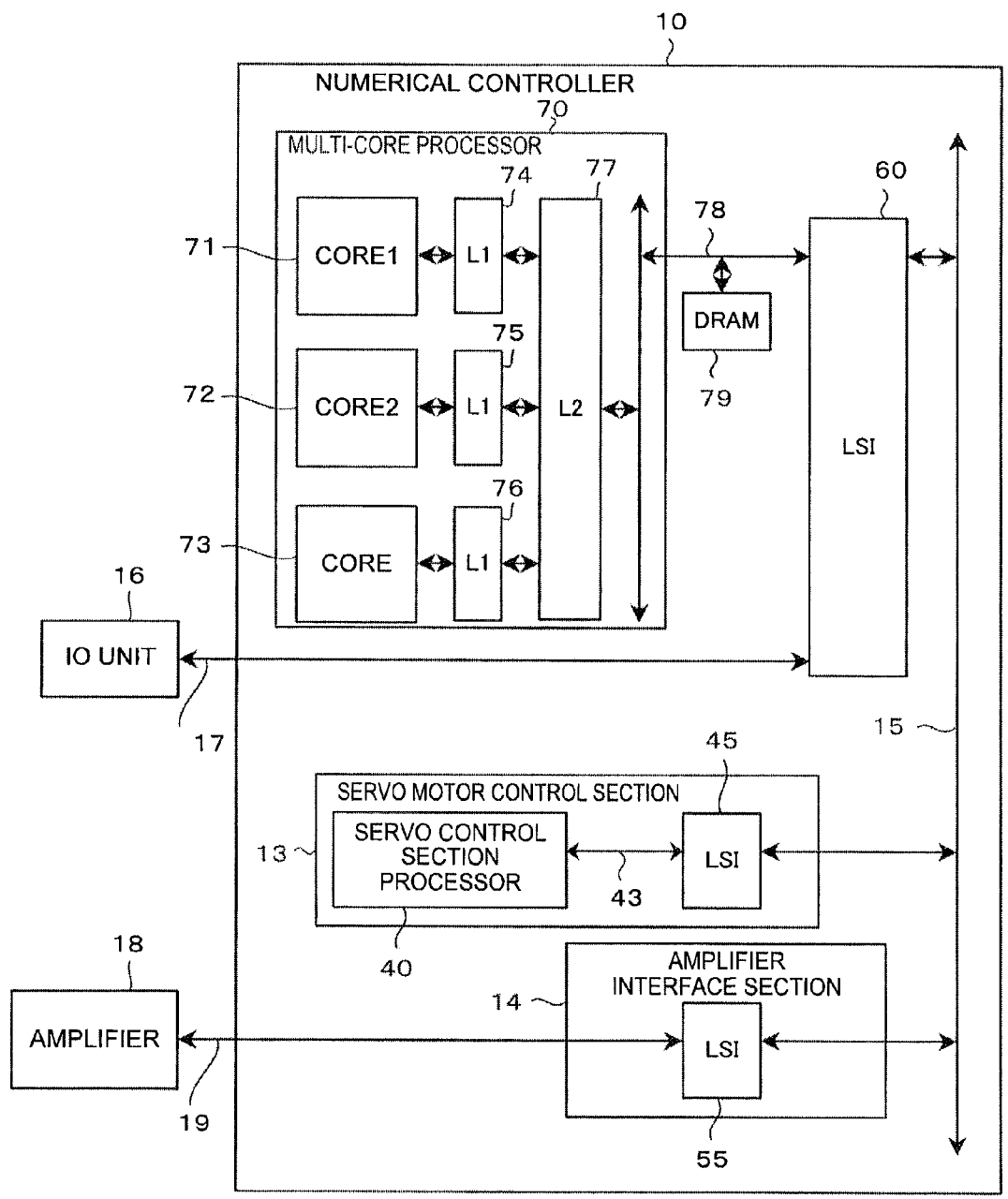
FIG. 1 is a diagram depicting a configuration of a numerical controller that executes a sequential program using a multi-core processor.

Embodiments of the present invention will be described in conjunction with the drawings. Components of the embodiments which are identical or similar to the corresponding components of the conventional technique are described using the same reference numerals.

FIG. 1 is a diagram depicting a configuration of a numerical controller that executes sequential program using a multi-core processor.

A numerical controller 10 includes a multi-core processor 70, a servo motor control section 13, and an amplifier interface section 14.

The multi-core processor 70 has three cores assigned as a first numerical control section processor core 71, a second numerical control section processor core 72, and a PMC control section processor core 73. The processor cores 71, 72, and 73 connect to respective independent first-level instruction cache memories. The first numerical control section processor core 71 connects to a first instruction cache memory (L1 cache) 74. The second numerical control section processor core 72 connects to a second instruction cache memory (L1 cache) 75. The PMC control section processor core 73 connects to a third instruction cache memory (L1 cache) 76.

The multi-core processor 70 is configured such that a second-level cache memory is shared by the plurality of cores. The first instruction cache memory 74, the second instruction cache memory 75, and the third instruction cache memory 76 are connected to a cache memory (L2 cache memory) 77 that is a second-level cache memory.

The multi-core processor 70, a DRAM 79, and an integrated peripheral LSI 60 are connected together via a bus 78. A machine side IO unit 16 is connected to the integrated peripheral LSI 60 via a field bus 17.

The servo motor control section 13 includes a servo control section processor 40 and a peripheral control LSI 45. These elements are connected together via a bus 43. The amplifier interface section 14 includes a peripheral control LSI 55. A motor control amplifier 18 is connected to the peripheral control LSI 55 of the amplifier interface section 14 via a serial servo bus 19.

The multi-core processor 70, the servo motor control section 13, and the amplifier interface section 14 are connected together via an internal bus 15.

In the numerical controller 10 depicted in FIG. 1, a sequential program P is executed, for example, by alternately using two cores in cache information, a core number 1 (first numerical control section processor core 71) and a core number 2 (second numerical control section processor core 72).

First, a first embodiment of the controller according to the present invention will be described using FIGS. 2 to 11.

Figure 2:
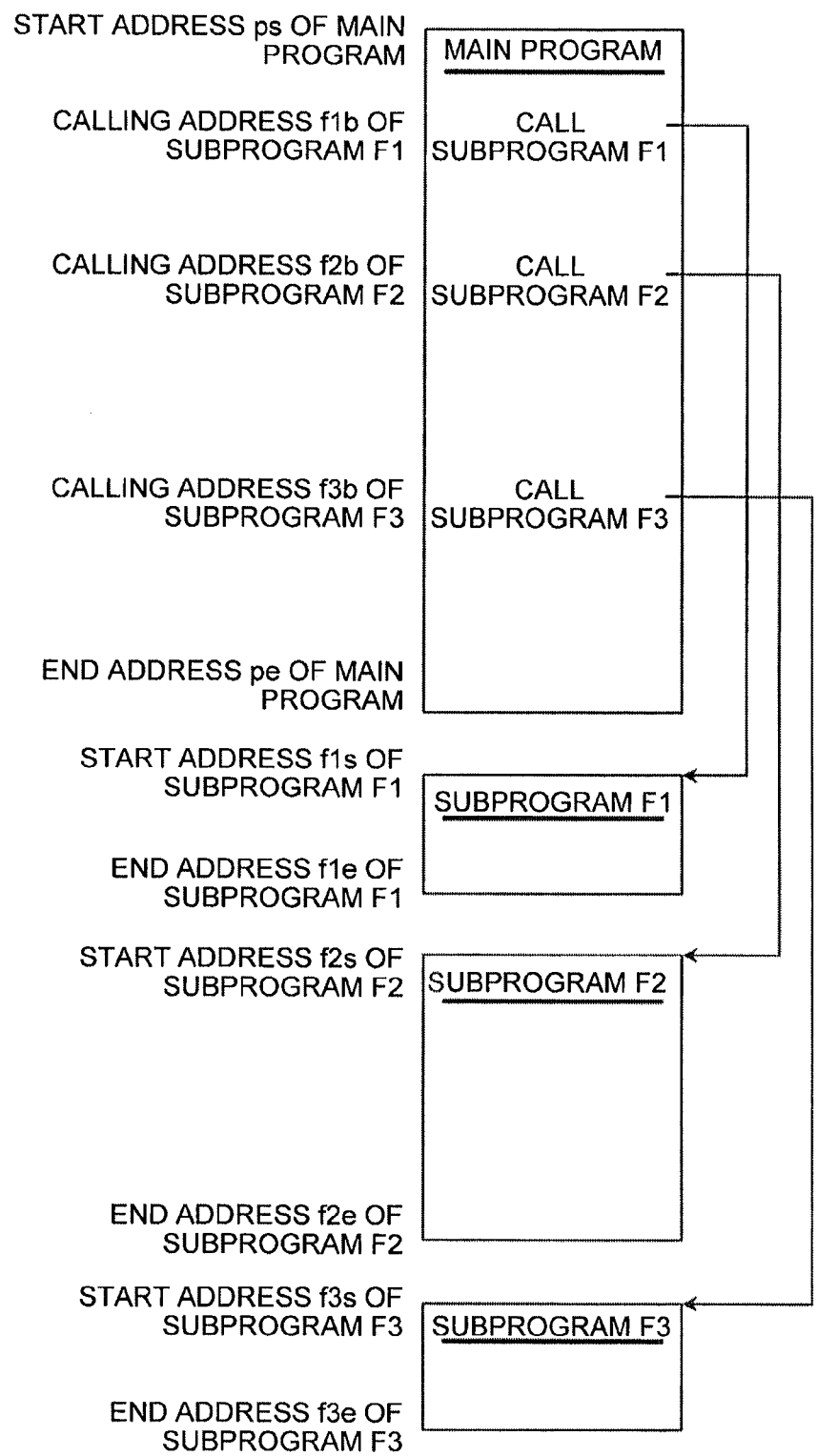
FIG. 2 is a diagram depicting arrangement of a sequential program P on a memory in a first embodiment of the controller according to the present invention.
Figure 3:
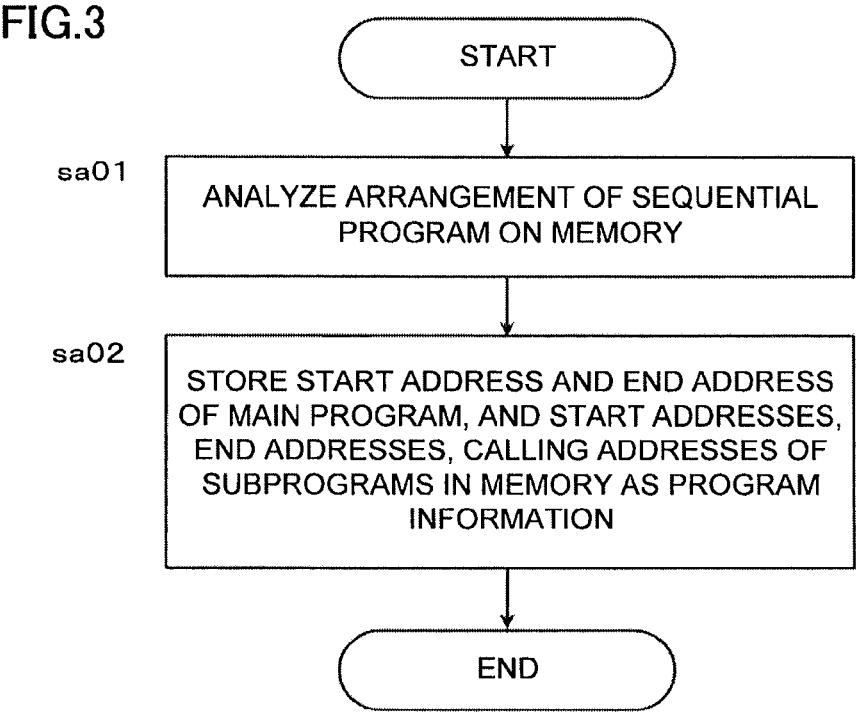
FIG. 3 is a flowchart depicting processing by a program profile information generating section in the first embodiment of the controller according to the present invention.
Figure 4:
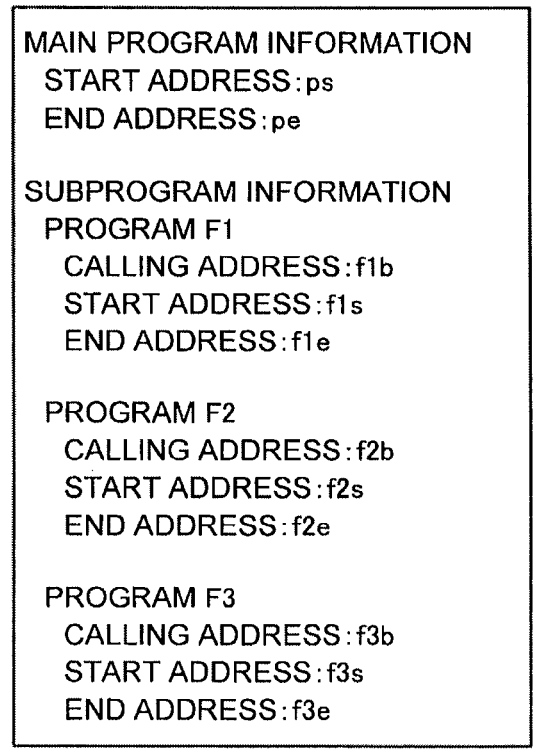
FIG. 4 is a diagram depicting an example of program profile information.

FIG. 2 is a diagram depicting arrangement of the sequential program P on the memory (for example, the DRAM 79). FIG. 3 is a flowchart depicting processing by a program profile information generating section in the first embodiment of the controller according to the present invention. FIG. 4 is a diagram depicting an example of program profile information.

As depicted in FIG. 2, in the sequential program P, the start address of a main program is denoted by ps, and the end address of the main program is denoted by pe. A subprogram F1 is called up using an address f1b. A subprogram F2 is called up using an address f2b. A subprogram F3 is called up using an address f3b. The start address of the subprogram F1 is denoted by f1s, and the end address of the subprogram F1 is denoted by f1e. The start address of the subprogram F2 is denoted by f2s, and the end address of the subprogram F2 is denoted by f2e. The start address of the subprogram F3 is denoted by f3s, and the end address of the subprogram F3 is denoted by f3e.

In this embodiment, in processing by the program profile information generating section depicted in FIG. 3, the arrangement of the sequential program P(FIG. 2) on the memory (DRAM 79 in FIG. 1) is analyzed (see FIG. 3). This analysis (step sa01) allows collection of information on the start addresses and end addresses of the main program and the subprograms called by the main program, and the calling addresses of the subprograms. The collected information is stored in the memory as program profile information (step sa02).

In the sequential program P depicted in FIG. 2, the start address ps and end address pe of the main program, and the calling addresses f1b, f2b, and f3b, start addresses f1s, f2s, and f3s, and end addresses f1e, f2e, and f3e of the three subprograms F1, F2, and F3 are stored in the memory (DRAM 79 in FIG. 1) as program profile information (FIG. 4).

Figure 5:
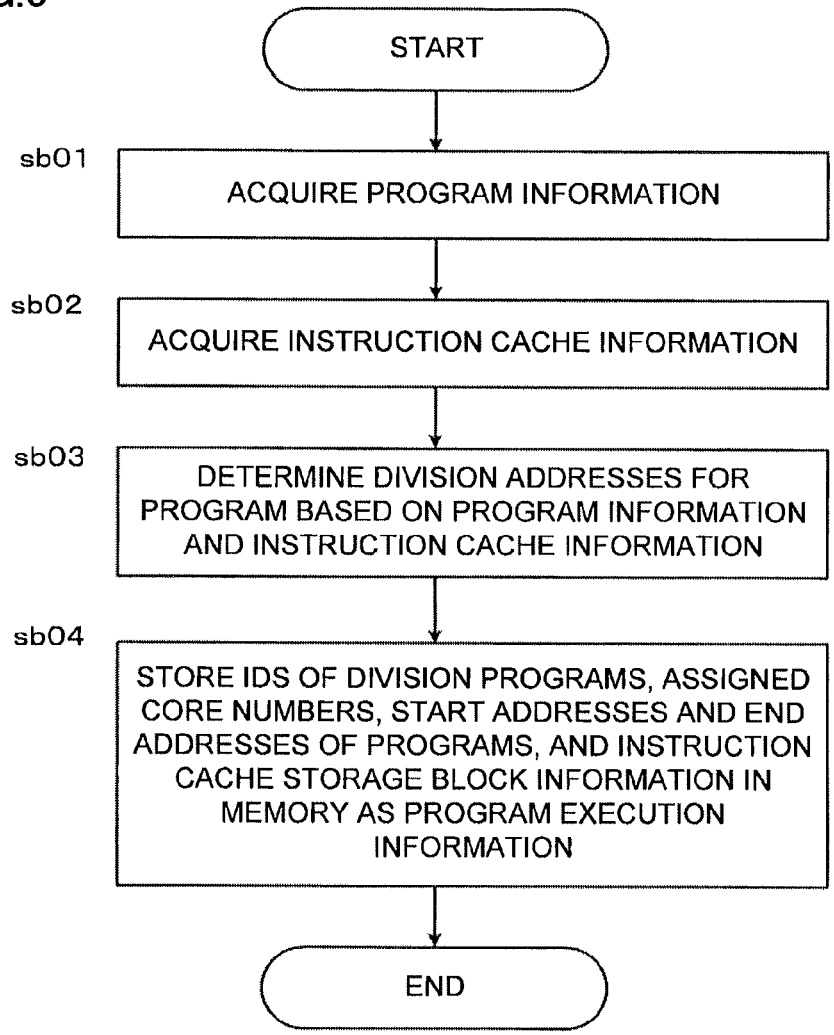
FIG. 5 is a flowchart depicting processing by a program execution information generating section in the first embodiment of the controller according to the present invention.

Now, a method in which a program execution information generating section in the first embodiment of the controller according to the present invention divides the sequential program P will be described. As illustrated in a flowchart in FIG. 5 depicting processing by the program execution information generating section, the sequential program P is divided into programs each with a size to be fitted into the instruction cache memory using the program profile information (see FIG. 4) and prepared instruction cache memory information (the capacity and usage rate of the instruction cache memory of each core) depicted in FIG. 7. Information on the divided programs is stored in the memory as program execution information (see FIG. 8).

The flowchart in FIG. 5 depicting the processing by the program execution information generating section will be described in accordance with steps.

The program profile information (see FIG. 4) on the sequential program P is acquired (step sb01). The instruction cache memory information is acquired (step sb02). Based on the program profile information and the instruction cache memory information, division addresses at which the sequential program is divided are determined (step sb03). The IDs of the division programs, assigned core numbers, the start addresses and end addresses of the programs, and cache storage block information are stored in the memory (DRAM 79 in FIG. 1) as program execution information (step sb04).

Figure 6:
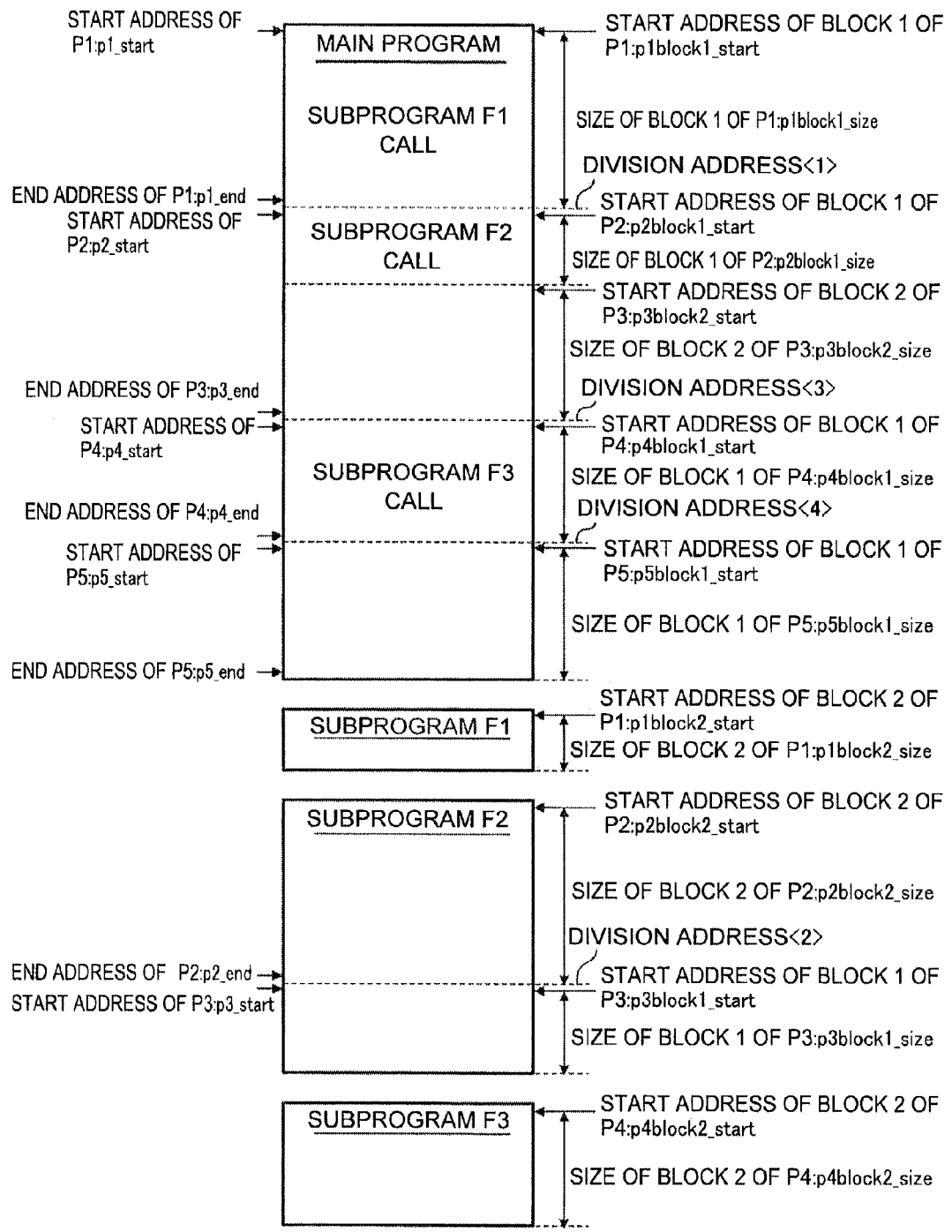
FIG. 6 is a diagram depicting division of the sequential program P.

Now, the division of the sequential program P depicted in FIG. 6 will be specifically described.

Figure 7:
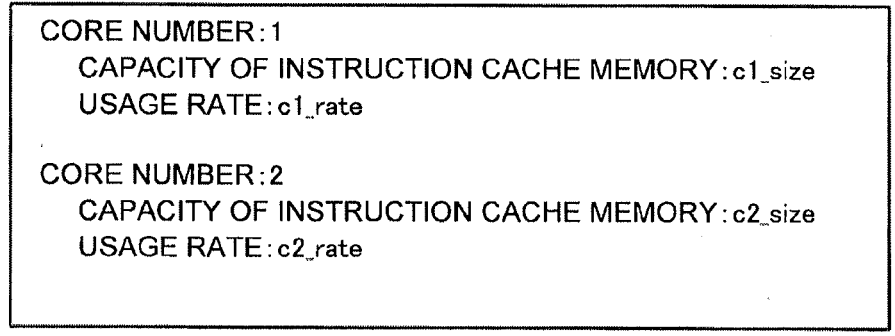
FIG. 7 is a diagram depicting an example of information in an instruction cache memory.

FIG. 6 is a diagram depicting division of the sequential program P. FIG. 7 is a diagram depicting information on the instruction cache memories. FIG. 8 is a diagram depicting the program execution information.

First, such a division address <1> as sets the size of the program to be equal to or smaller than the product of the capacity 'c1_size' of the instruction cache memory with a core number 1 and usage rate 'c1_rate' is determined. Thus, a division program P1 is obtained.

The following are stored in the memory as the program execution information (see FIG. 8): the start address 'p1_start' and end address 'p1_end' of the division program P1, the start address 'p1block1_start' and size 'p1block1_size' of a block 1 stored in the instruction cache memory, and the start address 'p1block2_start' and size 'p1block2_size' of a block 2.

Then, such a division address <2> as sets the size of the program to be equal to or smaller than the product of the capacity 'c2_size' of the instruction cache memory with a core number 2 and usage rate 'c2_rate' is determined. Thus, a division program P2 is obtained.

The following are stored in the memory as the program execution information: the start address 'p2_start' and end address 'p2_end' of the division program P2, the start address 'p2block1_start' and size 'p2block1_size' of a block 1 stored in the instruction cache memory, and the start address 'p2block2_start' and size 'p2block2_size' of a block 2.

Subsequently, a division address <3> and a division address <4> are similarly determined, and the program is divided at the division addresses to obtain division programs P3, P4, and P5. The start addresses, end addresses, and block start addresses of the respective programs are stored in the memory as program execution information.

FIG. 8 is a diagram depicting the program execution information stored in the memory.

Figure 9:
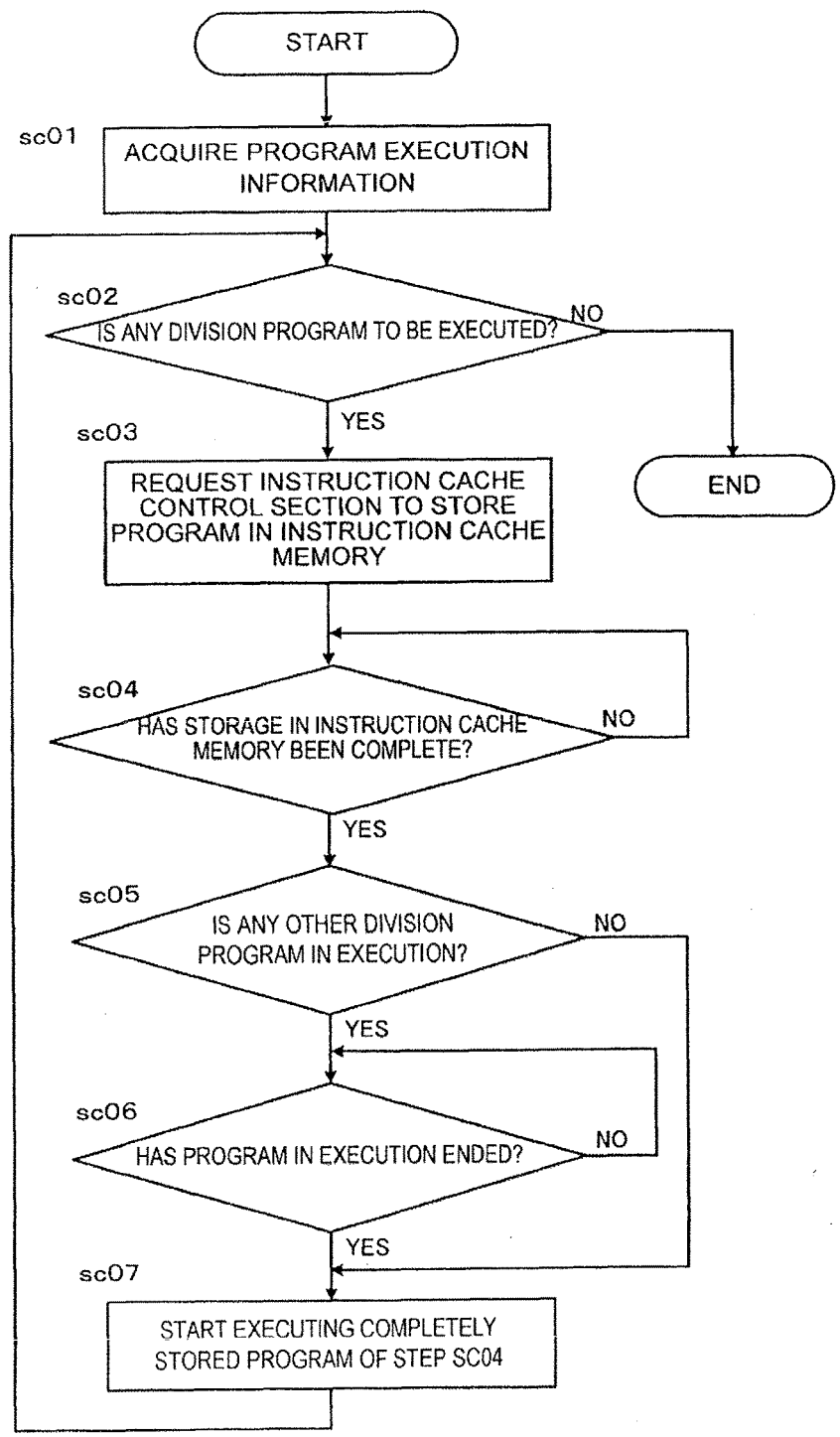
FIG. 9 is a flowchart depicting processing by a scheduler section in the first embodiment of the controller according to the present invention.
Figure 10:
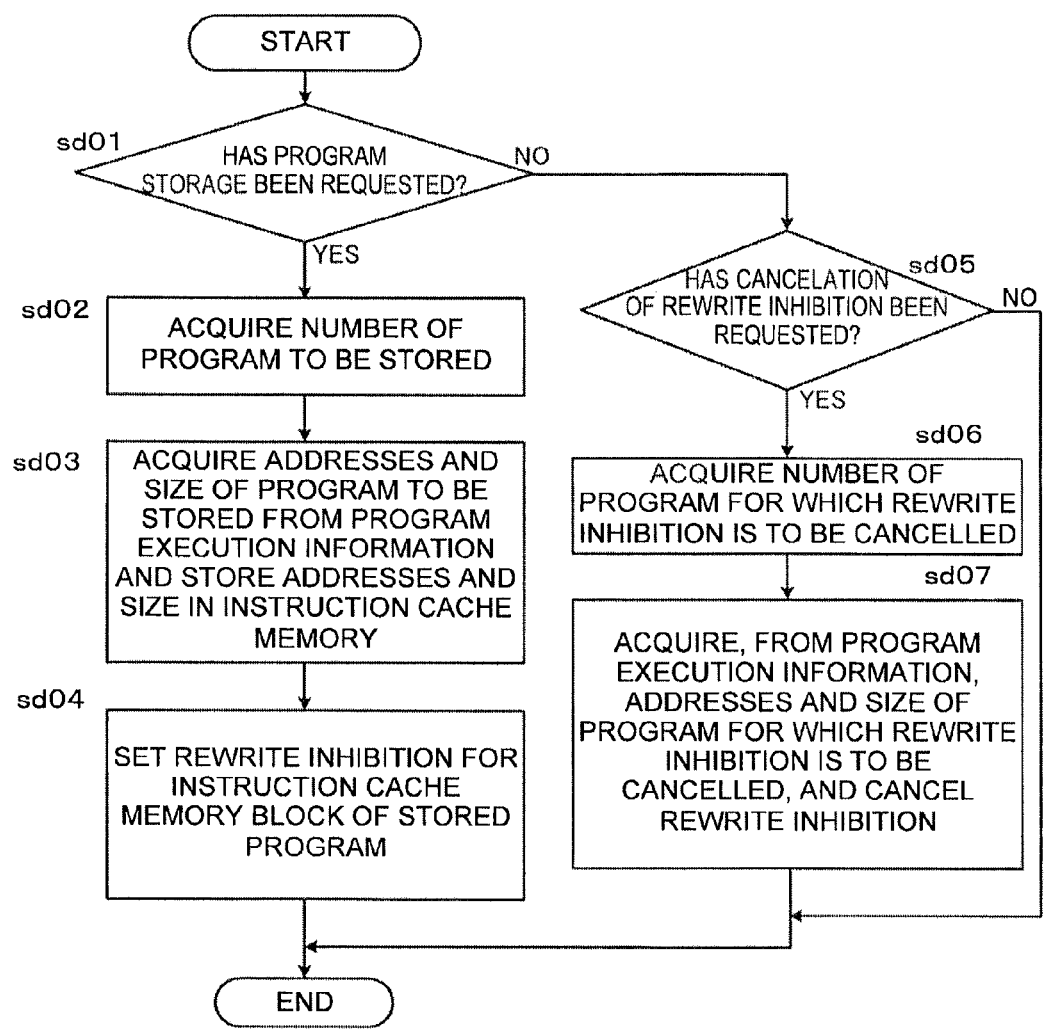
FIG. 10 is a flowchart depicting processing by a cache control section in the first embodiment of the controller according to the present invention.
Figure 11:
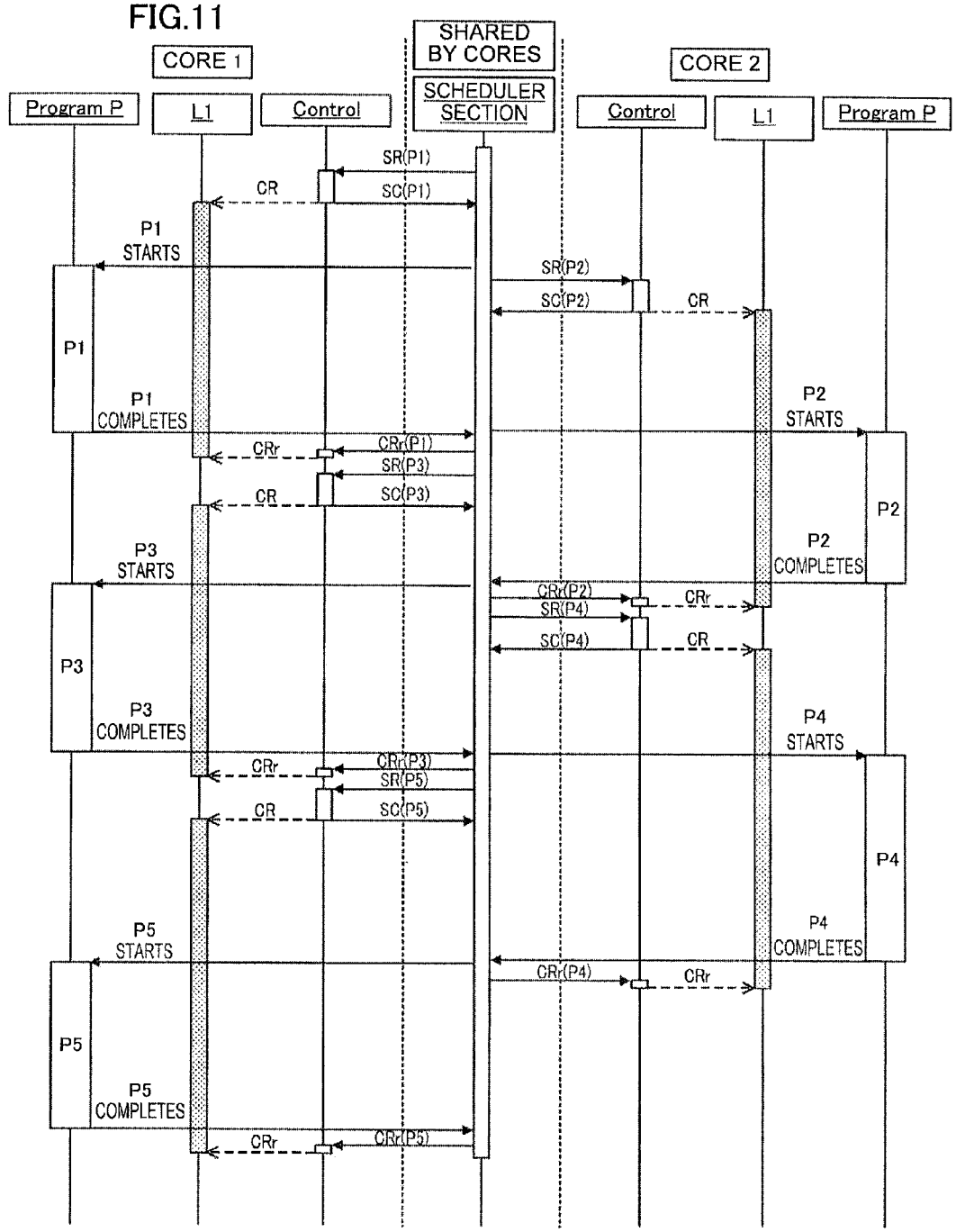
FIG. 11 is a diagram depicting a sequence executed by the first embodiment of the controller according to the present invention.

The program execution information on the division program P1 is as follows:
  Assigned core number: 1
  Block start address: p1_start
  Program end address: p1_end
  Cache storage block information
  Start address of the block 1: p1block1_start
  Size of the block 1: p1block1_size
  Start address of the block 2: p1block2_start
  Size of the block 2: p1block2_size The program execution information on the division program P2 is as follows:
  Assigned core number: 2
  Block start address: p2_start
  Program end address: p2_end
  Cache storage block information
  Start address of the block 1: p2block1_start
  Size of the block 1: p2block1_size Start address of the block 2: p2block2_start
Size of the block 2: p2block2_size
The program execution information on the division program P3 is as follows:
  Assigned core number: 1
  Block start address: p3_start
  Program end address: p3_end
  Cache storage block information
  Start address of the block 1: p3block1_start
  Size of the block 1: p3block1_size
  Start address of the block 2: p3block2_start
  Size of the block 2: p3block2_size
The program execution information on the division program P4 is as follows:
  Assigned core number: 2
  Block start address: p4_start
  Program end address: p4_end
  Cache storage block information
  Start address of the block 1: p4block1_start
  Size of the block 1: p4block1_size
  Start address of the block 2: p4block2_start
  Size of the block 2: p4block2_size
The program execution information on the division program P5 is as follows:
  Assigned core number: 1
  Block start address: p5_start
  Program end address: p5 end
  Cache storage block information
  Start address of the block 1: p5block1_start
  Size of the block 1: p5block1_size
  Start address of the block 2: p5block2_start
  Size of the block 2: p5block2_size Now, execution of the divided programs by the cores will be described using FIG. 9, FIG. 10, and FIG. 11. FIG. 9 is a flowchart depicting processing by a scheduler section in the first embodiment of the controller according to the present invention. FIG. 10 is a flowchart depicting processing by a cache control section in the first embodiment of the controller according to the present invention. FIG. 11 is a diagram depicting a sequence executed by the first embodiment of the controller according to the present invention. In FIG. 11, the instruction cache memory is simply referred to as the "cache".

The flowchart of the processing executed by the scheduler section, depicted in FIG. 9, will be described in accordance with steps.

The program execution information is acquired from the memory of the controller (step sc01). When any division program is to be executed (step sc02), the scheduler section requests the instruction cache control section to store the division program in the instruction cache memory (step sc03). When the storage in the instruction cache memory is complete (step sc04), the scheduler section checks whether or not any division program is in execution (step sc05). When a division program is in execution, the division program stored in the instruction cache memory waits for the division program in execution to end (step sc06). When no division program is in execution, the completely stored division program starts to be executed (step sc07). The scheduler section returns to step sc02 to continue processing.

FIG. 10 is a flowchart of processing executed by the cache control section. The processing will be described below in accordance with steps.

The cache control section determines whether or not a program storage request has been issued (step sd01). When the program storage request has been issued, the program number of the program to be stored is acquired (step sd02). The addresses and size of the division program to be stored are acquired from the program execution information and stored in the instruction cache memory (step sd03). The instruction cache memory block of the stored division program is set for rewrite inhibition (step sd04) to end the processing. On the other hand, when no program storage request has been issued, the cache control section checks whether any request to cancel rewrite inhibition has been issued (step sd05). When a request to cancel rewrite inhibition has been issued, the number of the program for which the rewrite inhibition is to be canceled is acquired (step sd06). The addresses and size of the program for which the rewrite inhibition is to be canceled are acquired from the program execution information. The rewrite inhibition is canceled (step sd07) to end the processing.

As depicted in the flowchart of the scheduler section in FIG. 9, the scheduler section, shared by the cores, requests the cache control section to store the division program P1 in the instruction cache memory and to inhibit rewriting of the instruction cache memory with the program P1 stored therein (locking of the instruction cache memory) based on the program execution information (see FIG. 8), sufficiently before activation of the sequential program P is started.

Upon receiving the request, the cache control section stores the program P1 in the instruction cache memory, locks the instruction cache memory with the program P1 stored therein, and notifies the scheduler section of fulfillment of the request, as depicted in the flowchart in FIG. 10. Upon receiving the notification of fulfillment of the request from the cache control section, the scheduler section activates the program P1 at a time to start activating the sequential program P.

Then, while the program P1 is in execution, the scheduler section requests the cache control section of the core 2 to store the program P2 to be executed next based on the program execution information, in the instruction cache memory of the core 2 and to lock the instruction cache memory with the program P2 stored therein. Upon receiving the request, the cache control section stores the program P2 in the instruction cache memory, and locks the instruction cache memory with the program P2 stored therein.

After the issuance of the request to the cache control section is complete and after the program P1 in execution ends, the scheduler section immediately starts executing the program P2 and requests the cache control section to unlock the instruction cache memory of the core 1, which has executed the program P1.

Subsequently, a similar procedure is used to execute the programs P3, P4, and P5.

A second embodiment of the controller according to the present invention will be described with reference to FIGS. 12 to 15.

Figure 12:
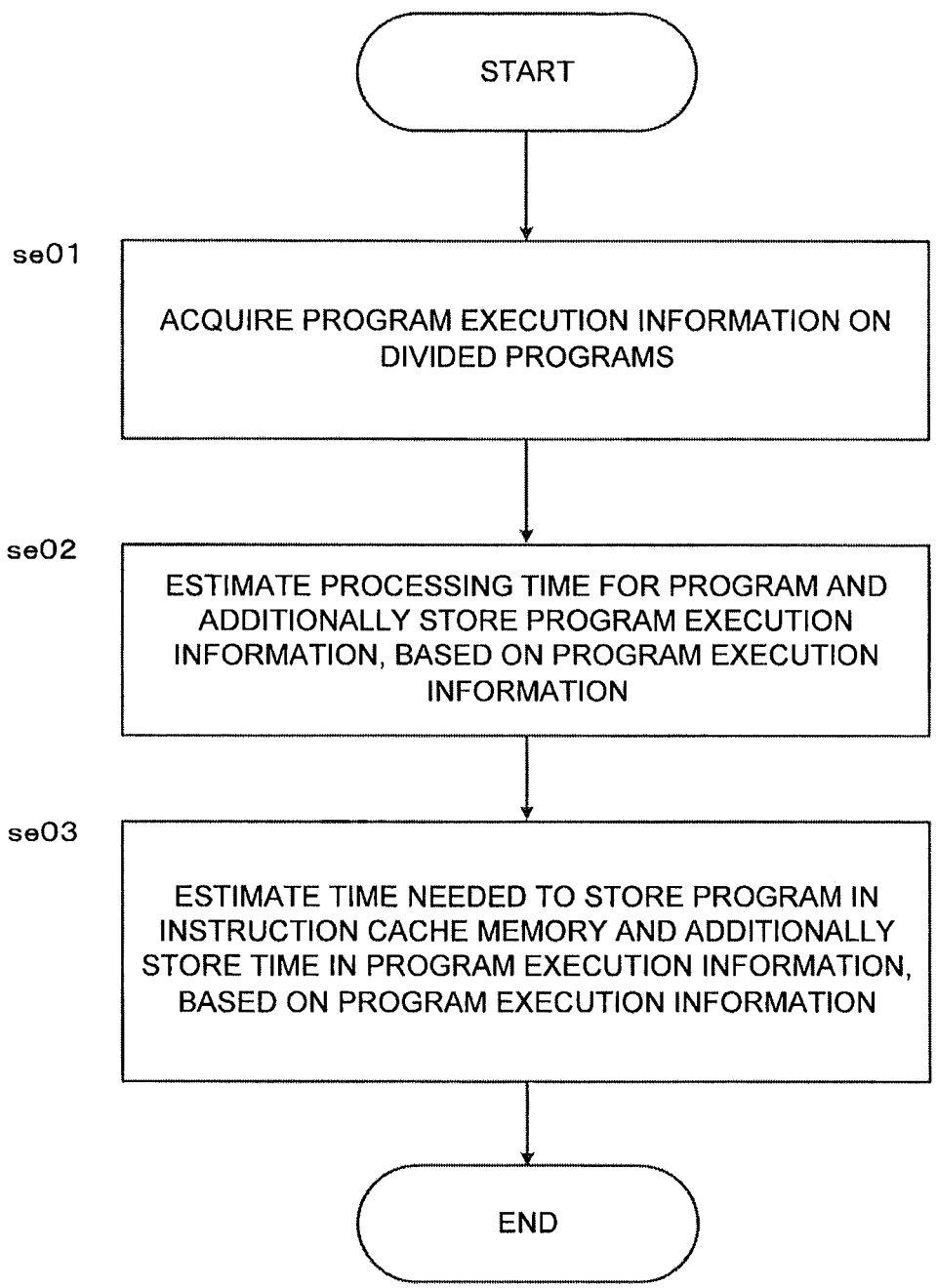
FIG. 12 is a flowchart depicting processing by a processing time estimating section and a cache storage time estimating section in a second embodiment of the controller according to the present invention.
Figure 14:
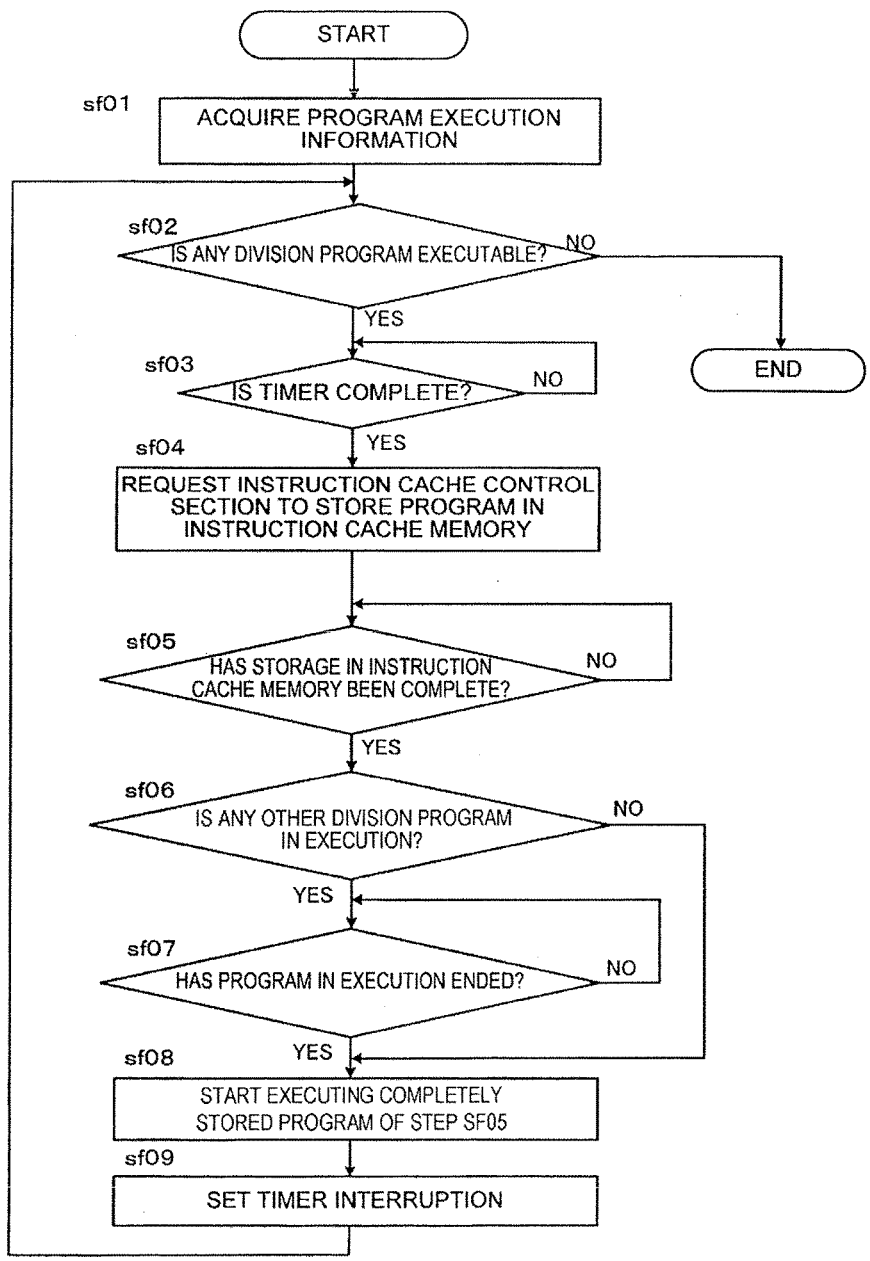
FIG. 14 is a flowchart depicting processing by a scheduler section in the second embodiment of the controller according to the present invention.
Figure 15:
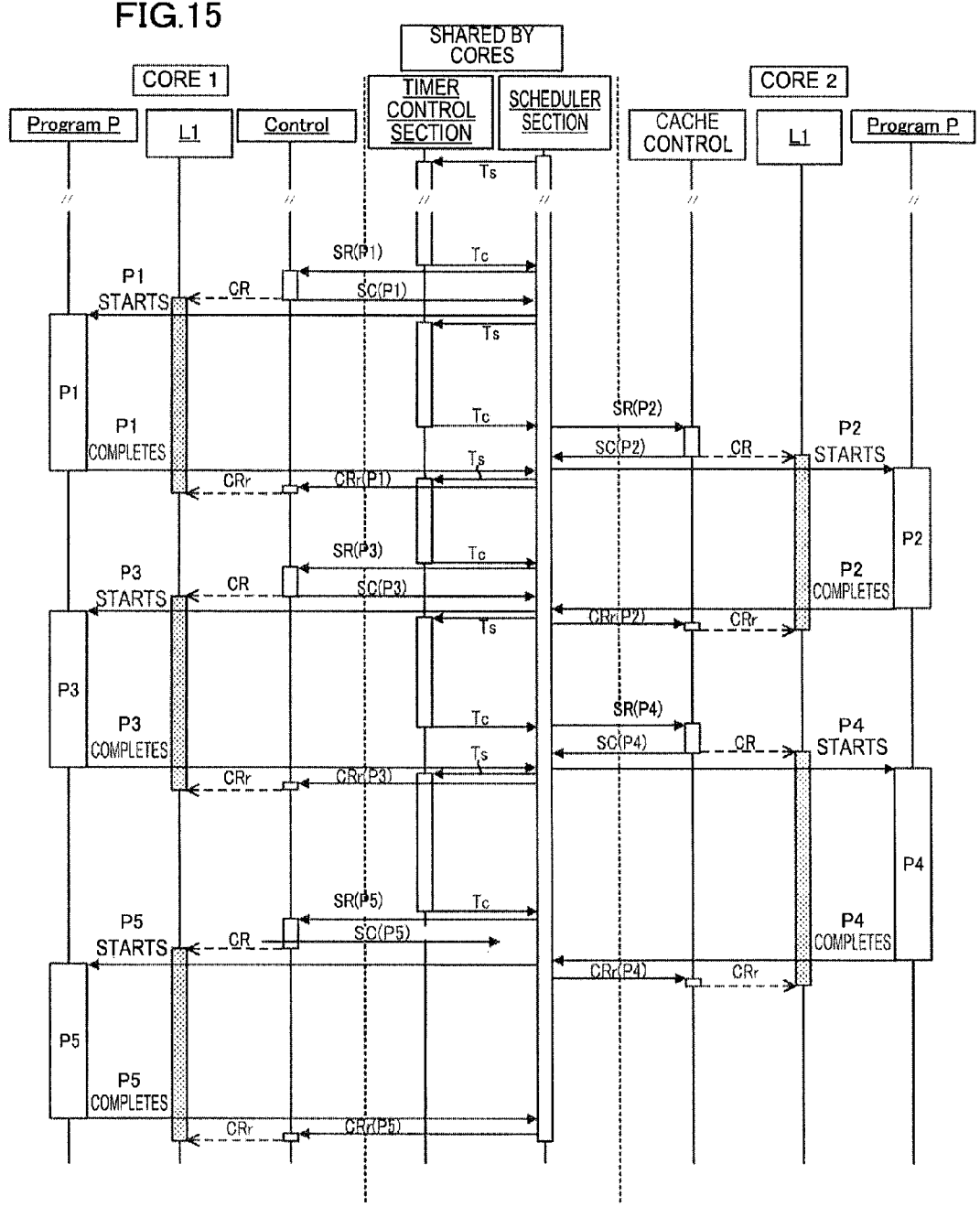
FIG. 15 is a diagram depicting a sequence executed by the second embodiment of the controller according to the present invention.
Figure 16:
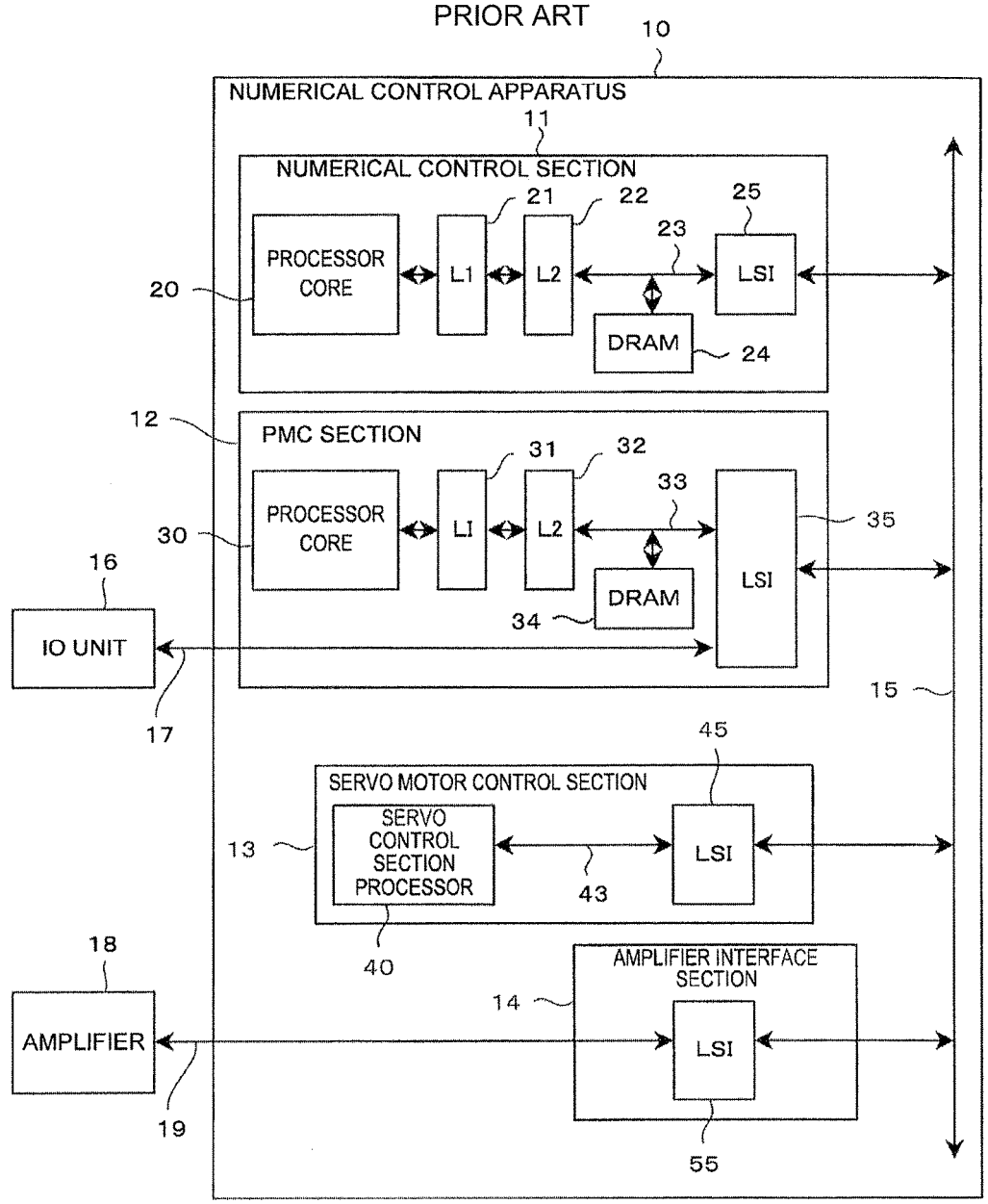
FIG. 16 is a diagram depicting a configuration of a conventional numerical controller.

FIG. 12 is a flowchart depicting processing by a processing time estimating section and a cache storage time estimating section in a second embodiment of the controller according to the present invention. FIG. 13 is a diagram depicting an example of the program execution information. FIG. 14 is a flowchart depicting processing by a scheduler section in the second embodiment of the controller according to the present invention. FIG. 15 is a diagram depicting a sequence executed by the second embodiment of the controller according to the present invention. In FIG. 15, the instruction cache memory is simply referred to as the "cache".

The controller of the present embodiment corresponds to the controller of the above-described first embodiment in which additionally the processing time estimating section analyzes the program data on the memory to estimate the processing time for each divided program and stores the processing time in the program execution information and in which the instruction cache memory storage time estimating section estimates the time needed to store each divided program in the instruction cache memory based on the program execution information and stores the time in the program execution information (see FIG. 12).

FIG. 12 is a flowchart depicting processing by the processing time estimating section and the cache storage time estimating section. The processing will be described in accordance with steps. The program execution information on the division programs is acquired (step se01). Based on the program execution information, the processing time for the program is estimated and additionally stored in the program execution information (step se02). Based on the program execution information, the time needed to store the program in the instruction cache memory is estimated and additionally stored in the program execution information (step se03). In this regard, the processing in step se02 corresponds to the processing time estimating section, and the processing in step se03 corresponds to the cache storage time estimating section.

The scheduler section issues a request to store the nth (n>1) program Pn in the instruction cache memory when a time from the activation of the n−1th program until the start of storage in the instruction cache memory elapses (the processing time 'p(n−1)run_time' for the n−1th program minus the time 'pnsave_time' needed to store the nth program in the instruction cache memory). The request to store the program P1 in the instruction cache memory is issued the instruction cache memory storage time before the time to periodically activate the sequential program.

In the embodiment, as depicted in the flowchart of the processing by the scheduler section in FIG. 14, the scheduler section sets a time to start storage in the instruction cache memory, in a timer control section that notifies the scheduler section of a timer event when the set time is reached. Thus, the scheduler section requests the cache control section to store the nth program Pn in the instruction cache memory, using the timer event that occurs when the set time is reached. As shown in FIG. 14, the program execution information is acquired from the memory of the controller (step sf01). When any division program is executable (step sf02), the scheduler section checks if the timer is complete (step sf03). When the timer is complete (step sf03), the scheduler section requests the instruction cache control section to store the division program in the instruction cache memory (step sf04). When the storage in the instruction cache memory is complete (step sf05), the scheduler section checks whether or not any division program is in execution (step sf06). When a division program is in execution, the division program stored in the instruction cache memory waits for the division program in execution to end (step sf07). When no division program is in execution, the completely stored division program starts to be executed (step sf08). The scheduler section sets the timer interruption (step sf09) and returns to step sf02 to continue processing.

The scheduler section presets a timer value in the timer control section so that the timer event occurs 'p1save_time' (the cache storage time for the first program) before the activation period time for the sequential program. Using the timer event, the scheduler section requests the cache control section to store the program P1 in the instruction cache memory of the core 1 and lock the instruction cache memory with the program P1 stored therein.

Upon receiving the request, the cache control section, in accordance with the flowchart of the processing by the cache control section in FIG. 10, stores the program P1 in the instruction cache memory, locks the instruction cache memory with the program P1 stored therein, and notifies the scheduler section of fulfillment of the request.

Upon receiving the notification of completion of fulfillment of the request from the cache control section, the scheduler section activates the program P1 and sets a timer for 'p1run_time' minus 'p2save_time' in the timer control section, when a time to start activating the sequential program is reached. Then, using the timer event from the timer control section, the scheduler section requests the cache control section of the core 2 to store the program P2 in the instruction cache memory and lock the instruction cache memory with the program P2 stored therein, based on the program execution information.

Upon receiving the request, the cache control section stores the program P2 in the instruction cache memory, locks the instruction cache memory with the program P2 stored therein, and notifies the scheduler section of fulfillment of the request.

When the scheduler section receives the notification of fulfillment of the request from the cache control section and when the program P1 in execution ends, the scheduler section immediately starts executing the program P2, sets a timer for 'p2run_time' minus 'p3save_time' in the timer control section, and requests the cache control section to unlock the instruction cache memory of the core 1, which has executed the program P1. Subsequently, a similar procedure is used to execute the programs P3, P4, and P5 (FIG. 15).

This minimizes the time for which the instruction cache memory is locked as a result of the execution of the sequential program P, and is expected to improve the performance of the system as a whole.

The invention claimed is:

1. A controller comprising a multi-core processor comprising a plurality of cores with independent instruction cache memories to execute a sequential program with a size exceeding a capacity of one of the instruction cache memories, the controller comprising:
   a memory in which the sequential program is stored; and
   the multi-core processor configured to execute instructions to perform a method including:
      analyzing an arrangement of the sequential program in the memory to generate and store program profile information in the memory;
      dividing, based on the program profile information, the sequential program into a plurality of divided programs each with a size fitted into one of the instruction cache memories and storing program execution information on the divided programs in the memory;
      storing, in accordance with the program execution information, a first divided program in a first instruction cache memory of the instruction cache memories and inhibiting rewriting of the first instruction cache memory with the first divided program stored therein by locking the first instruction cache memory;
      storing, after execution of the first divided program stored in the first instruction cache memory is started and before execution of the first divided program stored in the first instruction cache memory has ended, based on the program execution information, a second divided program to be executed next in a second instruction cache memory of another core and inhibiting rewriting of the second instruction cache memory with the second divided program stored therein by locking the second instruction cache memory;

starting execution of the second divided program to be executed next when the first divided program in execution ends; and cancelling the inhibiting of rewriting of the first instruction cache memory of the core having executed the first divided program by unlocking the first instruction cache memory when the first divided program in execution ends.

2. The controller according to claim 1, wherein the multi-core processor is further configured to execute instructions to perform the method including:

estimating a processing time for each of the divided programs;

estimating a time needed to store each of the divided programs in a corresponding instruction cache memory; and starting storing of the second divided program in the second instruction cache memory when a remaining execution time before an end of the first divided program in execution becomes equal to a time needed to store the second divided program to be executed next in the second instruction cache memory.

\* \* \* \* \*